Nov. 21, 1939.   H. BOEDDINGHAUS   2,181,043
FELTED FABRIC AND METHOD OF MAKING THE SAME
Filed July 8, 1939
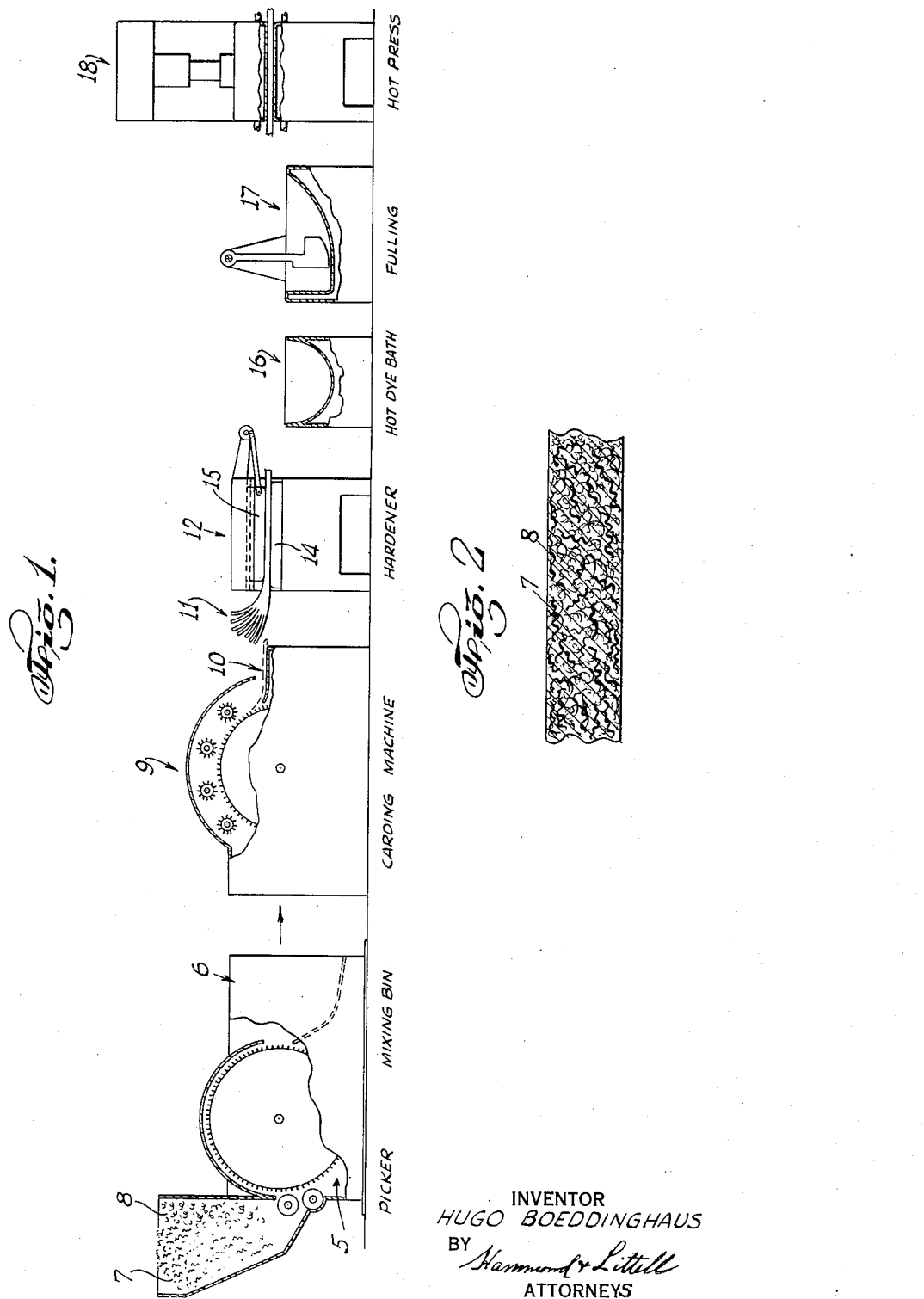
INVENTOR
HUGO BOEDDINGHAUS
BY Hammond & Littell
ATTORNEYS Patented Nov. 21, 1939

2,181,043

UNITED STATES PATENT OFFICE 2,181,043

FELTED FABRIC AND METHOD OF MAKING THE SAME

Hugo Boeddinghaus, Newburgh, N. Y., assignor to American Felt Company, New York, N. Y., a corporation of Massachusetts Application July 8, 1939, Serial No. 283,424

12 Claims. (Cl. 28—1)

The present invention relates to the making of a felted fabric and has for an object to provide an improved method or process for producing fabrics of this type.

Another object is to provide an improved felted fabric.

Another object of the invention is to provide a more economical method for producing a felted fabric which can be operated effectively and expeditiously.

Another object is to provide a method of making felted fabrics wherein the characteristics of stretched fibres made from certain synthetic resins can be advantageously used to replace either partially or wholly the shrinkage achieved by normal felting operations.

Artificial fibres have recently been formed from various thermoplastic synthetic resins by processes which involve stretching during the process of making and which give to the fibres the property of shrinking approximately to original length when heated to a critical temperature. For convenience of description this product will be termed "stretched fibres" or "stretched fibrous material". Such stretched fibres may be produced from, for example, methyl methacrylate (sold under the trade-mark "Lucite"), urea formaldehyde, phenol formaldehyde, polystyrene and various vinyl resins and other resins and similar materials which have thermoplastic properties and which can be spun or otherwise worked to produce such stretched fibres. These artificial fibres under consideration are stretched from 50 or 100% to 300% of their natural length as formed at the spinning head and differ materially from the ordinary unstretched artificial fibres.

It has been proposed heretofore to combine ordinary artificial fibres made from cellulose and cellulose derivatives or from resins with wool and other fibre in the making of felt according to the usual processes, the artificial fibres merely functioning as ordinary fibre. In contrast with this the present invention proposes the use of artificial fibres which are considerably stretched during the production thereof and which as the result of that stretching have the property of shrinking 10% to 50% or more of their length.

Thte invention proposes furthermore a method of making felt containing these special fibres whereby the shrinkage of the fibres is effected under conditions such as most effectively to shrink and condense the felt.

In accordance with the present invention fibres of this character are combined by mixing, picking and carding together with other fibrous material suitable for use in felt, such as wool, hair, fur or the like to form a batt. Non-felting fibrous material such as cotton, jute, rayon, and the like may be included in the mixture to reduce the cost or to provide desired qualities. The batt is first felted to bond the mixture of fibrous materials, after which heat is applied to shrink the thermoplastic stretched fibre, thereby causing the entire partially felted mass to shrink in. The fabric is then fulled to touch which may require 10 or 15 minutes or, if a more compact quality is desired, several hours or even days. The preliminary felting of the material to form a bond may be accomplished by any of the usual processes such as hardening in accepted manner, fulling or even needle felting. How far the preliminary felting is carried will depend upon the quality of felt to be produced. For certain less expensive products a light preliminary felting followed by heating to shrink the stretched fibre and then by fulling to improve the bond gives a good product at low cost.

The term "felting" is used in a broad sense in this specification as well as in the claims to describe the operations of matting together the fibres, whether this is accomplished in a hardening operation wherein the wet batt is rubbed between two flat members or by fulling in the fulling machine or by otherwise felting.

The nature and objects of the invention will be better understood from a description of a particular illustrative embodiment for the purpose of which description reference will be had to the accompanying drawing forming a part hereof and in which—

Figure 1 is a diagrammatic illustration of an apparatus for practicing the process of the invention, and Fig. 2 is a cross-sectional view of the fabric produced by the process described.

In the embodiment to be more particularly described for the purposes of illustrating the principles of the invention a suitable stock is mixed in the picker and mixing bin 5, 6. The stock consists of a mixture of fibrous material 7 such as commonly used in making felt, to which has been added stretched fibrous material 8. The mixed fibre is carded in cards, such as indicated at 9, to form webs 10, and a number of such webs are combined to form a batt 11, which is ready for felting to bond the fibres as is usual practice in the making of felt. Felting of the fibre is obtained by the same process as in making of ordinary felt. In the example, the batt is hardened in a plate hardener 12. The hardener is of conventional construction comprising a bed 14 and an upper plate 15, which is vibrated relative thereto to cause the fibres to bond together.

After this preliminary felting of the batt, heat is applied to shrink the stretched thermoplastic fibres, which are distributed throughout the material. This may be accomplished preferably by immersion in boiling water or by applying dry heat or steam. The hot dye bath indicated at 16 may serve both as a hot shrinking bath and as a dye bath. The heat treatment for shrinking the fibre may require from about five minutes to perhaps an hour, depending upon the details of the method used, the characteristics of the particular fibre used and the extent of shrinkage desired. The temperature should be sufficient to shrink effectively the particular fibre used, usually about 180 to 212° F. By this shrinking of the fibre the fabric will be shrunk longitudinally, transversely or both depending on the lay of the fibre in the batt. The extent of shrinkage will depend upon the conditions. It may be as much as 50% in one or both directions with a corresponding increase of thickness. The fabric may then be given additional felting as in the fulling machine 17 after which it is dried and given a final pressing in the press indicated at 18 to smooth and further compact the material, as usual in the production of felt of some qualities. The pressing under heat produces additional bond and gives greater firmness to the felted fabric. If desired the heat may be such as to fuse the thermoplastic to produce a certain specific result.

The extent of the felting will vary according to the character and quality of the material to be produced. For some qualities a few minutes of hardening in the usual hardener will be sufficient to accomplish the necessary preliminary bonding. For felt of some qualities it will be desirable to further felt the material in the fulling machine for a few minutes or hours before heating to shrink the stretched fibres. The temperature of the subsequent heat treatment will depend upon the particular fibre used, and in some cases upon the required extent of shrinkage of the stretched fibre. Usually a temperature of 180° to 212° or with some fibres 250° F. will produce the desired results. Some stretched vinyl resin fibre can be sufficiently shrunk in the dye bath at a boiling temperature or even at lower temperatures as 175° to 200° F., depending on the molecular construction and characteristics of the resin from which the synthetic fibres were made.

After the heat treatment the fabric may be further felted in the fulling machine until the desired quality is obtained. This process improves the bond of the material and toughens the fabric. The material is noticeably improved by fulling for 15 to 30 minutes and it may be fulled for 6 or 8 hours to advantage for certain qualities.

In the method described the shrinking of the synthetic stretched fibres will shrink in the entire felted fabric in both width and length in a short time to dimensions which otherwise could only have been produced by lengthy fulling or other mechanical operations having a more or less detrimental effect on the fabric being felted. Further fulling after shrinking improves the bond and the touch.

The steps of the process described are similar to the same steps as performed in making felt. For example, when fulling, the material is wet with a dilute sulphuric acid solution or with a soap solution as is usual in making felt. The hardening process also is a wet process.

The shrinkage of the material can be varied by using different proportions of stretched fibre and by applying different heat treatments, or by varying the construction of the carded batt. For example, samples of stretched vinyl resin fibre have been found to shrink 12% at 167° F., 30% at 176° F. and nearly 50% at 212° F. Obviously the shrinkage will depend upon the amount of stretch given to the fibre during certain stages of manufacture.

Various other stretched thermoplastic fibres than those particularly mentioned are suitable for use in the process described.

*Example I.*—A high grade felt suitable for use as backcheck may be made from a batt containing 10 to 20% stretched vinyl resin fibre with the balance consisting of wool. Such material should be hardened for 2 to 5 minutes and thereafter heated for 5 to 15 minutes at a temperature of 212° F. to shrink the vinyl resin fibre and thereafter fulled to touch. The further fulling will require perhaps 1 to 2 hours.

*Example II.*—A high grade felt suitable for use as shoe felt may be made from a batt containing 10 to 20% stretched methyl methacrylate fibre, the balance consisting of a mixture of at least 20% felting wool with cotton, rayon or other fibres. Such material should be fulled for from 10 to 20 minutes and thereafter dyed at the boil, during which operation the stretched fibres create felt shrinkage. The fabric will then be fulled to touch which will require ½ to 1½ hours.

*Example III.*—A fabric for use as pad felt may be produced by combining 90% of cattle hair with 10% stretched polystyrene fibre. A batt of this composition is hardened and the stretched fibre shrunk by treating at a temperature of 212° F. This is followed by fulling to touch if necessary. (½ to 1 hour is sufficient.)

*Example IV.*—A light weight wool fabric for under collar cloth or millinery may be produced from a batt containing 5 to 15% methyl methacrylate stretched fibre and the balance wool or wool shoddies. Such material should be hardened and then heated for several minutes to allow shrinkage. Further slight fulling (as 15 to 45 minutes) may or may not be necessary.

*Example V.*—An under collar felt may be produced by combining 70% virgin wool, 25% low grade shoddy and 5% stretched methyl methacrylate fibre to form a batt containing 8 to 10 ounces of material per square yard. The batt should be hardened for perhaps five minutes at a luke warm temperature (100 to 120° F.) and then shrunk in boiling water. After this it should be fulled for perhaps thirty minutes. The product will be found to be the equivalent of that made by ordinary processes and fulled for as much as two hours. Te shrinkage of this felt will amount to about 20% in both directions.

Woven fabrics can also be produced by the use of the stretched fibre as a component of the yarn or otherwise combined. The percentage of shrunk fibre should amount to perhaps 10 to 20% of the total fibre. The woven fabric is shrunk by immersion in boiling water as in the case of the felt. The shrinkage provides a peculiar shrunk condition of the fabric that is particularly effective for certain purposes.

It is one of the advantages of the invention that certain types of felt can be produced by fulling for a much shorter time with the attendant reduction of cost and with an improvement in the quality of the felt. This results from the shrinking in action of the resin fibres.

It is another advantage of the invention that a uniform felt can be produced.

Other advantages will be obvious from the particular description which, however, is intended as illustrative and not as defining the limits of the invention.

As a modification of the process more particularly described, the felt may be heated to such higher temperature as will fuse the thermoplastic fibres to cause a flowing of the thermoplastic and adherence to the natural fibres to cause positive cementing, as described in my co-pending application Ser. No. 211,926, filed June 4, 1938.

I claim—

1. The method of producing a felted fabric which comprises forming a mixture of natural fibrous material and stretched thermoplastic fibres into a batt, felting the batt to bond the material and heating the same to shrink the thermoplastic fibres and thereby shrinking in the entire fabric in both directions.

2. The method of producing a felted fabric which comprises combining a mixture of natural fibres and stretched thermoplastic fibres in a batt, felting the batt to bond the fibres and subjecting the same to the action of water at a temperature of about 212° F. thereby to shrink the thermoplastic fibres causing the entire fabric also to shrink.

3. The method of forming a felted fabric which comprises carding a mixture of fibrous material including about 20% of stretched thermoplastic fibrous material, felting the same and thereafter subjecting the same to the action of heat sufficient to shrink the stretched fibrous material causing the entire fabric to shrink.

4. The method of forming a felted fabric which comprises carding a mixture of fibrous material including 10 to 25% of stretched thermoplastic fibrous material, forming the carded material into a batt of considerable thickness, hardening the same to bond the fibrous material together and subjecting the same to the action of heat sufficient to shrink the thermoplastic fibres causing the entire fabric to shrink.

5. The method of producing a felted fabric which comprises carding a mixture of natural fibres and stretched thermoplastic fibres, felting the fibres to bond the same in a sheet and heating the sheet to shrink the thermoplastic fibres thereby causing the entire sheet to shrink and thereafter fulling the fabric.

6. The method of producing a felted fabric which comprises combining natural animal fibrous material and stretched thermoplastic fibrous material in a batt, felting the batt to bond the fibrous material relatively lightly, heating the lightly bonded batt to a temperature sufficient to shrink substantially the thermoplastic fibrous material and thereafter further felting the felt fabric.

7. The method of producing a felted fabric which comprises forming a mixture of natural fibrous material and stretched thermoplastic fibres into a batt, first felting the batt to bond the fibrous material, then heating the batt to a temperature of about 180° to 212° F. to cause shrinkage of the thermoplastic fibre to shrink in the fabric and thereafter fulling the fabric to improve the bond.

8. The method of producing a felted fabric which comprises forming a mixture of natural animal fibres and stretched thermoplastic fibres into a batt hardening the batt to a plate hardener to lightly bond the fibres together, heating the lightly bonded material to a temperature to shrink the thermoplastic fibres at least 25 to 50% and thereafter fulling the fabric.

9. The method of producing a felted fabric which comprises combining natural animal fibrous material and stretched thermoplastic fibrous material in a batt, hardening the batt in a plate hardener to preliminarily bond the fibrous material, then heating to a temperature sufficient to shrink the thermoplastic fibrous material 25% or more and thereafter fulling the fabric.

10. The product of the process defined in claim 1.

11. The product of the process defined in claim 5.

12. The product of the process defined in claim 8.

HUGO BOEDDINGHAUS.

CERTIFICATE OF CORRECTION.

Patent No. 2,181,043.                                    November 21, 1939.

HUGO BOEDDINGHAUS.

It is hereby certified that error appears in the printed specification of the above numbered patent requiring correction as follows: Page 1, first column, line 49, for "Thte" read The; page 2, second column, line 63, for "Te" read The; page 3, second column, line 29, claim 8, for the word "to" read in; and that the said Letters Patent should be read with this correction therein that the same may conform to the record of the case in the Patent Office.

Signed and sealed this 26th day of December, A. D. 1939.

Henry Van Arsdale,
Acting Commissioner of Patents.

(Seal)